United States Patent [19]

Cullen et al.

[11] Patent Number: 5,454,775

[45] Date of Patent: Oct. 3, 1995

[54] AUTOMATED EXCHANGEABLE PARTS FEEDING SYSTEM

[75] Inventors: W. Paul Cullen, Scotia; Thomas J. Petronis, Clifton Park; Clifford C. Annis, Schenectady, all of N.Y.; E. M. Ross, King of Prussia, Pa.

[73] Assignees: Applied Robotics, Inc., Glenville, N.Y.; Robotic Production Methods, Inc., King of Prussia, Pa.

[21] Appl. No.: 305,169

[22] Filed: Sep. 13, 1994

[51] Int. Cl.⁶ .................................................. B23Q 3/155
[52] U.S. Cl. .............................. 483/16; 221/11; 483/69
[58] Field of Search .......................... 483/16, 901, 12, 483/1, 69, 58; 221/11; 414/730; 29/771, 809

[56] References Cited

U.S. PATENT DOCUMENTS

| | | | |
|---|---|---|---|
| 3,367,476 | 4/1968 | Aronstein | 198/376 |
| 3,631,955 | 7/1972 | Chaplinski | 193/43 |
| 4,261,680 | 11/1981 | Carnley | 414/421 |
| 4,486,928 | 12/1984 | Tucker et al. | 483/901 X |
| 4,512,709 | 1/1985 | Hennekes | 414/729 |
| 4,620,362 | 8/1986 | Reynolds | 29/568 |
| 4,636,135 | 5/1987 | Bancon | 414/730 |
| 4,664,588 | 4/1987 | Newell | 414/730 |
| 4,710,093 | 11/1984 | Zimmer | 414/730 |
| 4,763,401 | 8/1988 | Marinoni | 29/568 |
| 4,784,421 | 1/1988 | Alvité | 294/86.4 |
| 4,809,425 | 3/1989 | Monforte | 483/1 |
| 4,815,780 | 12/1989 | Obrist | 294/86.4 |
| 4,911,490 | 3/1299 | Akagawa | 901/47 |
| 4,952,109 | 8/1990 | Hendricks | 414/224 |
| 4,980,963 | 8/1991 | Dinse | 29/568 |
| 5,058,724 | 4/1991 | Hinton | 198/376 |
| 5,139,132 | 7/1992 | Licht | 198/376 |
| 5,154,316 | 10/1992 | Holcomb et al. | 29/740 X |
| 5,299,351 | 4/1994 | Takahashi | 29/798 |

*Primary Examiner*—William Briggs
*Attorney, Agent, or Firm*—Heslin & Rothenberg

[57] ABSTRACT

An automated exchangeable parts feeding system which permits rapid exchange of parts presentation devices so that different size and shape parts can be handled on the parts feeding system. The automated exchangeable parts feeding system includes a parts presentation device having a tool exchange unit attached thereto, and a base exchange unit. The exchange units are mutually adapted to be coupled and decoupled to and from one another. At least one of the exchange units is controllably operable for coupling and decoupling. A robot arm or a pick and place device grasps and places the presentation device on the base exchange unit. The robot arm or pick and place device also functions to grasp and remove the presentation device from the base exchange unit. A control source coordinates the operation of at least one of the exchange units and the robot or pick and place device. The automated exchangeable parts feeding system further includes an optical detector, e.g., a fiberoptic sensor, for detecting the presence or absence of a part at a predefined location or the presentation device. The optical detector comprises at least one optical pathway section positioned and configured on each exchange unit so as to be optically aligned when the exchange units are coupled.

9 Claims, 2 Drawing Sheets

AUTOMATED EXCHANGEABLE PARTS FEEDING SYSTEM

BACKGROUND OF THE INVENTION

1. Technical Field

The present invention generally relates to parts handling equipment. More particularly, the present invention relates to parts feeding systems. Even more particularly, the present invention relates to parts feeding systems which utilize automated exchangeable parts presentation devices.

2. Background Information

Well known parts handling equipment, and more particularly, parts feeding systems, are integral to the manufacture of a wide array of products. Many different industries—including the automotive, fastener, food, electronics, packaging, pharmaceutical, and plastics—utilize parts feeding systems in product assembly and packaging operations. Bottles, bolts, tablets, connectors, capacitors, and bullet casings are just a few parts which are handled by parts feeding systems. Numerous products, such as tape recorders, cellular telephones, and clocks are manufactured through the utilization of parts feeding systems. A problem associated with parts feeding systems, however, is that they are dedicated manufacturing tools, designed to accommodate parts which are either identical or nearly identical in part size and geometry.

A typical parts feeding system comprises numerous components. First, a storage means, such as a bulk supply hopper or bin is used to store a plurality of parts. A conveyor or other feeder device transfers the parts from the storage means to a parts feeder, where separation, singulation, and orientation of the parts typically occurs. Parts feeders include vibratory bowl feeders, rotary and centrifugal parts feeders, and linear parts feeders. The parts feeding system may include one or more feeder elements for singulation and orientation of the parts moving therethrough. A linear parts feeder, such as a linear belt conveyor or a vibratory in-line feeder may be utilized as the orientation and presentation element. Feeder elements may also include means to reject or divert parts which are not properly oriented. The rejection of improperly oriented parts may be accomplished by various means, including gravity chutes, mechanical barriers, and air pressure. The combination of components so far described are also known as the recirculating feeder components.

One type of parts feeding system features a presentation block, where the parts are presented for final action. The presentation block may include an means for orienting the parts as they move from one end of the block to an opposite end. In this regard, a vibratory driver or a linear belt conveyor may be utilized. The presentation block may also include an escapement for parts singulation. This presentation block may also include pneumatic, and/or optical, and/or electronic sensors. The presentation block may also include a parts diverter for rejecting parts which become improperly oriented as they move along the block. This typical parts feeding system is made up of the recirculating feeder components and a presentation block for each part configuration. However, as parts feeding systems are designed for many different applications, there are numerous combinations of the above components.

The presentation block presents the final positioning of the parts or sets or arrays of parts so that they can be removed, one at a time, from a predefined pick-up point on the presentation block, so that the part or parts can be taken to the next manufacturing operation. Typically associated with known parts feeding systems is a means for detecting the presence or absence of a part at the predefined pick-up point on the presentation block. Detection of parts may be accomplished through various known detecting means, including electronic detectors, photoelectric detectors, and air detectors. Once a part is detected at the pick-up point, the parts feeding system may shut off, so that the part presented at the pick-up point may be removed and taken to the next manufacturing operation. During shut off, generally all feeding elements cease operating. By ceasing operation of all feeding elements in the system, "back up" of parts is prevented, which further facilitates the removal of parts from the block. Typically, a "pick and place" device or a robot is employed to remove the parts from the presentation block. Vision guided robotics are also being successfully integrated into parts feeding systems for the precise orientation of the parts as they are taken to the next manufacturing operation. Adept Technology, Inc., of San Jose, Calif., is a manufacturer of such advanced vision guided robot systems.

As stated above, typical parts feeding systems have limited flexibility because they can only accommodate parts which are either identical or nearly identical in part size and geometry. The limited flexibility of parts feeding systems is most apparent at the orientation component, which is specifically designed for a very specific part size and geometry. While some parts feeders can handle parts which vary minimally in size and shape, parts feeding systems in general have limited flexibility due to the inability to effectively handle different size and shape part configurations.

Over the years, parts feeding systems have evolved to accommodate improved feeding rates. Parts feeding systems utilizing "pick and place" devices or robotics to orient and transfer the parts from the presentation block to the next step in the manufacturing process operate under exceptionally fast rates. As an example, while it is possible to manually exchange one presentation block with a different presentation block so that a different shape and size part can be accommodated in the feeding system, the manual exchange of presentation blocks is a time consuming and therefore expensive practice. Currently, the exchange of presentation blocks requires a set up person to unscrew or unclamp the attached presentation block, and thereafter mechanically attach a different presentation block.

The consumer products marketplace embraces rapid change resulting in a limited market life for many products. This rapid change is most notable in the consumer electronics industry. In order for manufacturers to effectively compete in the consumer products marketplace, new products must be designed and manufactured in compressed time frames. Because the manual exchange of tooling elements, i.e., presentation blocks, is time consuming, manual exchange is often not conducive to industries having rapid production rates and short product development cycles. Manual exchange not only slows production, but the delays associated with the manual exchange of tooling elements also slows the product development cycle and adds additional cost to product development. Furthermore, the introduction of entirely new parts feeding systems as substitutes for existing systems does not provide a practical alternative.

Thus, a need exists for a "flexible" parts feeding system which permits rapid and automated exchange of parts presentation blocks or devices so that different size and shape parts can be handled in the parts feeding system, thereby lowering the product development cycle and reducing costs in the manufacturing process. Until now, the means for this rapid and "flexible" exchange of presentation blocks has not existed.

SUMMARY OF THE INVENTION

Briefly, the present invention satisfies this need and overcomes the shortcomings of the prior art through the provision of an automated exchangeable parts feeding system which includes a parts presentation device having a tool exchange unit attached thereto, and a base exchange unit mutually adapted to be coupled and decoupled to and from the tool exchange unit. At least one of the exchange units is controllably operable for coupling and decoupling. A controllable transfer means permits exchange of the presentation device. A control means provides coordination of the coupling mechanism associated with the exchange units and the transfer means.

Preferably, the controllable transfer means comprises a robot and a robot arm. Alternatively, the controllable transfer means may comprise a pick and place device. Typically, the automated exchangeable parts feeding system of the present invention includes means for detecting the presence or absence of a part at a predefined location on the presentation device. Preferably, an optical detector, such as a fiberoptic sensor, provides for detection. The optical detector comprises at least one optical pathway section positioned and configured on each exchange unit so as to be optically aligned when the exchange units are coupled.

Therefore, it is an object of this invention to provide a flexible parts feeding system having automated exchange of the presentation block of the parts feeding system.

It is another object of this invention to provide a flexible parts feeding system which provides rapid automated exchange of the presentation block of the parts feeding system.

Another object of this invention is to provide a flexible parts feeding system having an integrated parts detection system.

It is another object of this invention to provide a parts feeding system which reduces manufacturing costs associated with the assembly, packaging, and handling of parts and products.

Finally, it is another object of this invention to provide a flexible parts feeding system which reduces the time for design and introduction of new products into the marketplace.

These, and other objects, features and advantages of this invention will become apparent from the following detailed description of the various aspects of the invention taken in conjunction with the accompanying drawings.

DETAILED DESCRIPTION

Figure 1:
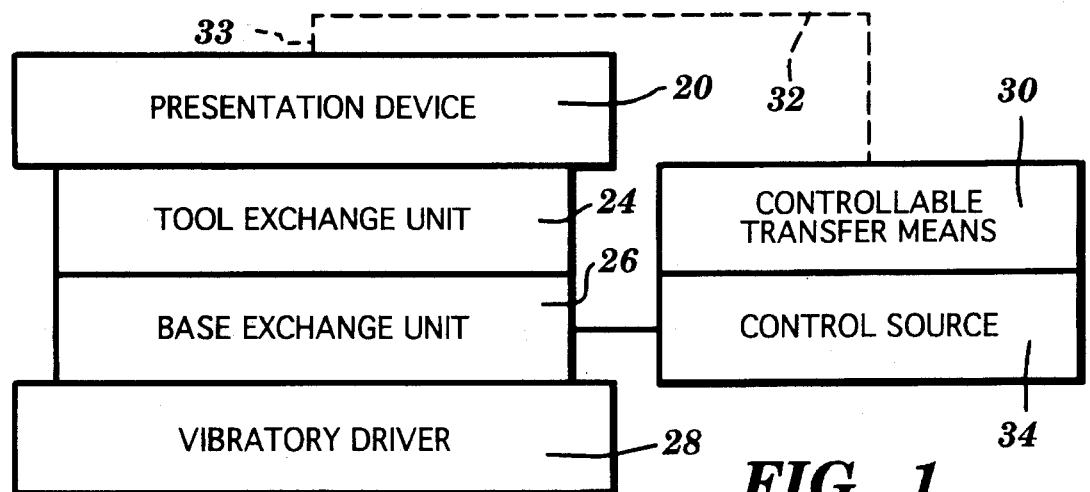
FIG. 1 is a system diagram representing the automated exchangeable parts feeding system of the present invention.

In reference to the drawings, and more specifically to FIG. 1, the automated exchangeable parts feeding system 10 of the present invention is shown. In the preferred embodiment, a parts presentation device 20 provides the final presentation of parts circulating through a complete parts feeding system. A tool exchange unit 24 is attached to the underside of the parts presentation device 20. Removably attachable to the underside of tool exchange unit 24 is a base exchange unit 26. The tool exchange unit 24 and the base exchange unit 26 are mutually adapted for coupling and decoupling to and from one another. In one aspect of the present invention, a linear parts feeder, such as a vibratory driver 28, is attached to the underside of base exchange unit 26. Vibratory driver 28 provides a directional amplitude, the force of which is transferred through both base exchange unit 26 and tool exchange unit 24 to presentation device 20, for moving parts along presentation device 20. In lieu of vibratory driver 28, other means for moving parts along presentation device 20 may be substituted therefor. For instance, presentation device 20 may include a linear belt conveyer (not shown) for moving parts along presentation device 20.

Once a part is finally presented on presentation device 20, the part may be removed by controllable transfer means 30, e.g., a robot, to be taken to the next manufacturing operation. Preferably, controllable transfer means 30 will coordinate an arm 32 to systematically remove parts from presentation device 20. It should be understood that the present invention is not limited to robotic removal means, and other means for removing parts from presentation device 20 may also be utilized. For instance, known "pick and place" devices could be used to remove parts from presentation device 20. "Pick and place" devices include pneumatically, electrically, and hydraulically operated devices. In the preferred embodiment, a control source 34, such as a robot controller or a digital computer, provides the control system for transfer means 30. Control source 34 will provide transfer means 30 with instructions on removing parts from presentation device 20. Control source 34 may also provide the coordination of the exchange units, i.e., coupling and decoupling of tool exchange unit 24 to and from base exchange unit 26.

Both tool exchange unit 24 and base exchange unit 26 are mutually adapted to be coupled and decoupled to and from one another. The coupling and decoupling of the exchange units is an important feature of the present invention, providing for the rapid exchange of presentation devices. For further detail on a known mechanism for coupling and decoupling base tool exchange unit 24 to and from base exchange unit 26, see U.S. Pat. No. 4,664,588, entitled APPARATUS AND METHOD FOR CONNECTING AND EXCHANGING REMOTE MANIPULABLE ELEMENTS TO A CENTRAL CONTROL SOURCE, owned by the Assignee of the present invention, Applied Robotics, Inc, of Schenectady, N.Y., which is hereby expressly incorporated by reference. Further information on the coupling and decoupling of exchange units may also be found in the product literature of Applied Robotics, Inc. For instance, Applied Robotic's XC5 XChange product is one exchange unit product which may be utilized in the present invention (see product literature AR1305/91). Briefly, the means for coupling and decoupling may comprise a latching mechanism utilizing an electrical, pneumatic, or electromagnetic method of connection.

Figure 2:
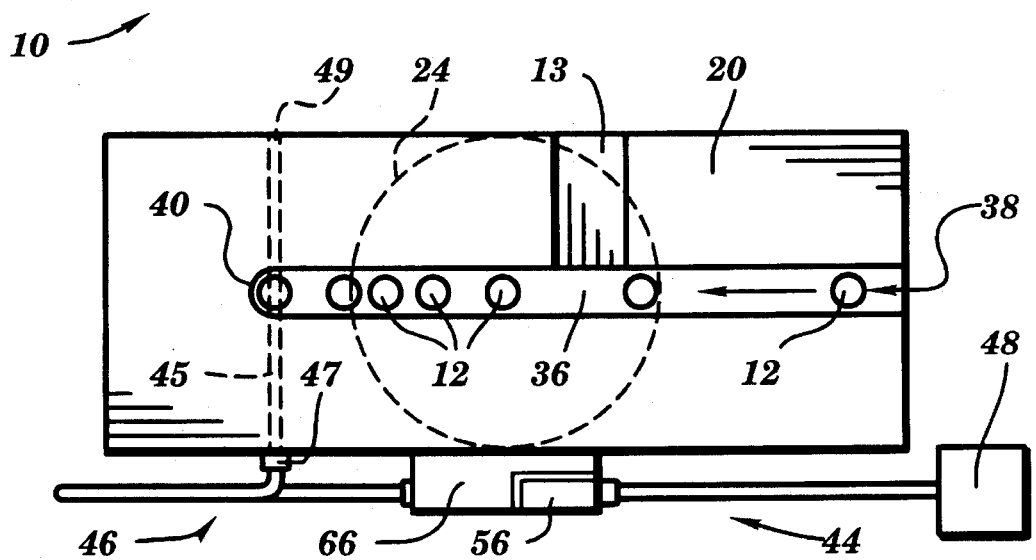
FIG. 2 is a top view of a presentation device and optical detector of the automated exchangeable parts feeding system of the present invention.

FIG. 2 depicts a top view of the automated exchangeable parts feeding system 10. Presentation device 20 is rectangular in shape, and includes a channel 36 which accommodates the flow of parts 12 therein. A parts diverter passage 13, may divert improperly oriented parts back into the recirculating feeder of the system. Presentation devices are machined specifically for precise part sizes and geometries, and therefore, different presentation devices will vary in size and shape. One manufacturer of such presentation devices is Robotic Production Methods, Inc., of King of Prussia, Pa. Channel 36, configured for a specific part size and geometry has an entry port 38 and a predefined pick-up point 40. Predefined pick-up point 40 is the location where parts 12 are removed from presentation device 20. Various known means move parts 12 through channel 36, for instance, a vibratory driver 28 (FIG. 1), may provide a directional amplitude for moving parts 12 from entry port 38 to pick-up point 40. Other well known means, not shown, including linear belt conveyors, are equally satisfactory.

As viewed from the top in FIG. 2, exchange units 24 and 26 are circular in cross section, and as such, shaped like a cylinder. While both tool exchange unit 24 and base exchange unit 26 are preferably cylindrical, other shapes may be equally satisfactory. For instance, exchange units 24 and 26 may be designed so that they match the rectangular shape of presentation block 20. However, for purposes of reducing the overall weight and cost of automated exchangeable parts feeding system 10, the cylindrical design is preferred. In the event that presentation device 20 is of considerable length, additional sets of exchange units may be utilized. Therefore, while in the embodiment shown in FIGS. 1–4, the automated exchangeable parts feeding system 10 has one set of exchange units 24 and 26, it is understood that additional sets of exchange units may be employed to provide greater stability for a lengthy presentation device.

Presentation device 20 may also include means for detecting the location of part 12 at a predefined pick-up point 40. Detection of parts may employ any known detection system; for example, an on/off binary detection system. The detection of a part at the pick-up point 40 typically shuts off parts feeding system 10 so that all parts in the system cease circulating therethrough. Once the system is shut off, a signal is sent to control source 34, e.g., a robot controller, so that controllable transfer means 30, e.g., a robot and robot arm, may remove the part from presentation device 20 and take it to the next manufacturing operation. Also, a vision guided robotics system may be simultaneously activated for the precise orientation of the part being removed. Preferably, an optical detector, such as a fiberoptic sensor 42 (FIG. 3) provides the means for detecting the placement of part 12. The optical detector comprises at least one optical pathway section positioned and configured on each exchange unit so as to be optically aligned when the exchange units are coupled. In lieu of an optical detector, other known detection means may be substituted therefor. For instance, electrical and air signals may be utilized.

Figure 3:
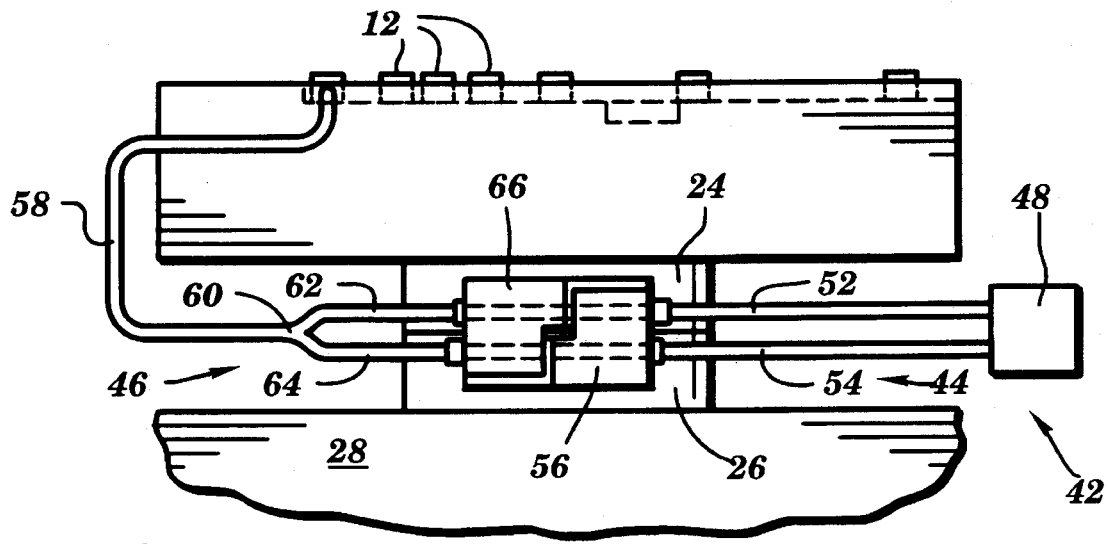
FIG. 3 is a side view of the automated exchangeable parts feeding system of the present invention.
Figure 4:
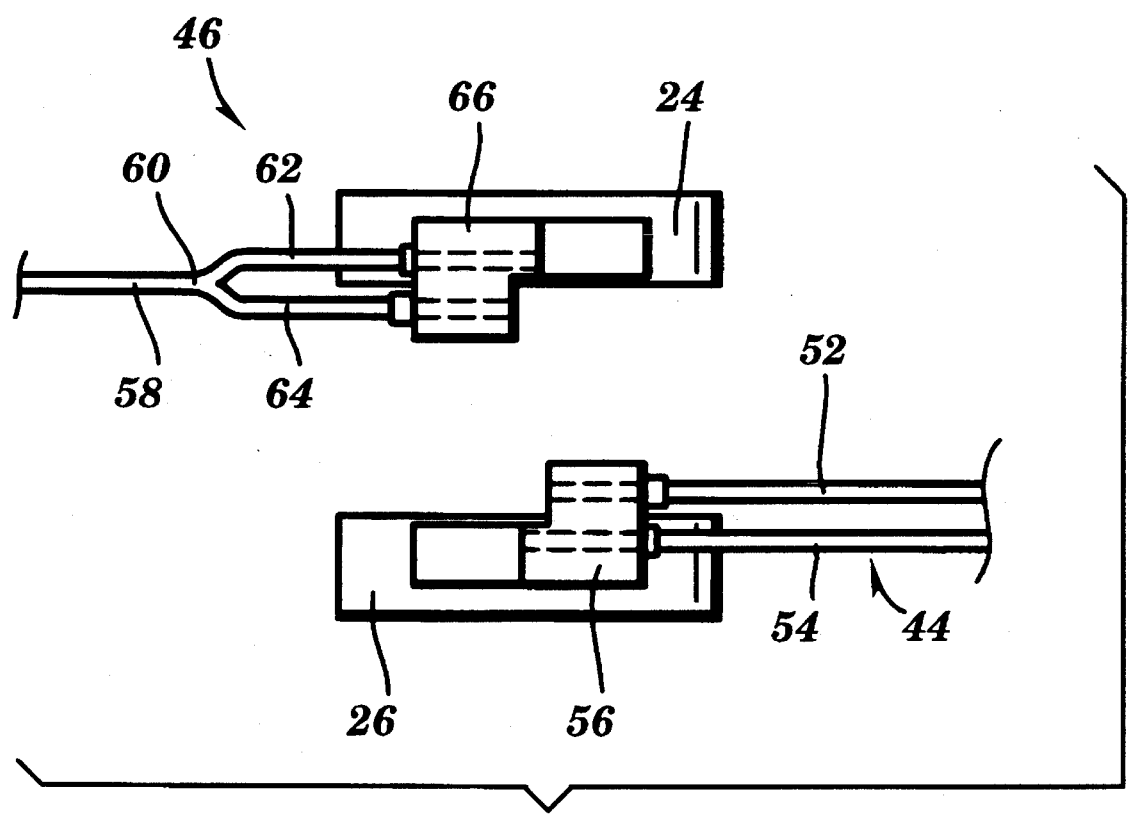
FIG. 4 is a blown-up view of the exchange units with attached housings of the automated exchangeable parts feeding system of the present invention.

In one embodiment of the present invention, presentation device 20 has an aperture 45 (FIG. 2) which passes through presentation device 20 orthoganol to channel 36 and intersects channel 36. Aperture 45 has an entry opening 47 and an exit opening 49. As can be seen in FIGS. 2 and 3, fiberoptic sensor 42 includes a first fiberoptic cable segment 44 and a second fiberoptic cable segment 46. First fiberoptic cable segment may include two cables, a sending cable 52 and a receiving cable 54. One end of both sending cable 52 and receiving cable 54 is exposed to a light source/light detector 48, while the opposite ends are attached to a first housing 56, which is mounted to base exchange unit 26.

Second cable segment 46 may include a single bifurcated cable portion 58. Second segment 46 splits into two separate cables at 60, a sending cable 62 and a receiving cable 64. Sending cables 52 and 62 correspond to each other, and receiving cables 54 and 64 correspond to each other. Both sending cable 62 and receiving cable 64 are attached to a second housing 66, which is mounted to tool exchange unit 24. Housings 56 and 66 may be detachably mounted to their respective exchange units. One end of second fiberoptic cable segment 46 is attached to presentation block 20 at entry opening 47 of aperture 45, while the opposite end is attached to tool exchange unit 24. When the exchange units are coupled, cable segments 44 and 46 become optically aligned for the transfer of optical signals through the exchange units.

In one aspect of the invention, an optical signal is sent from light detector 48, through both cable segments 44 and 46, and through aperture 45. When a part reaches pick-up point 40, the optical signal is blocked by the part, and the optical signal is reflected back through both cable segments 44 and 46. Once a part is detected, a control signal is sent to control source 34, so that the controllable transfer means 30 can remove the part.

While the fiberoptic sensor 42 described hereinabove employs a reflector-type system, variations may be substituted therefor. For example, instead of utilizing bifurcated forked cable segment 46, separate sending and receiving cables (not shown), divided into four separate segments, may be employed. In this alternative embodiment, one end of a first segment of the sending cable is attached to light source/light detector 48, and the second end is attached to base exchange unit 26. One end of a second segment of the sending cable is attached to tool exchange unit 24, and the opposite end is attached to entry opening 47 of aperture 45 of presentation device 20. At exit opening 49 of aperture 45, one end of a third segment of the sending cable is attached to the presentation device, and the opposite end of the third segment is attached to tool exchange unit 24. One end of a fourth segment of sending cable is attached to the base exchange unit 26, and the opposite end is attached to light source/light detector 48. When the exchange units are coupled, the first and second segments, and the third and fourth segments, respectively, are optically aligned with one another. In the absence of a part at pick-up point 40, the optical signal sent by light source/light detector 48 passes through the first and second segments of the sending cable, aperture 45, and third and fourth segments of the sending cable, completing a closed optical circuit. When a part is presented at pick-up point 40, the optical signal passing through aperture 45 becomes blocked, opening the optical circuit. When the circuit is opened, control source 34 may instruct the feeding elements of the system to deactivate. Simultaneously, a signal may be sent from control source 34 to controllable transfer means 30, instructing it to remove the presented part.

In the event that parts having a different shape and size are to be introduced into parts feeding system 10, but the current presentation device 20 does not accommodate such parts, a signal may be sent from control source 34 to one of the exchange units, and preferably, to base exchange unit 26, instructing decoupling of exchange units 24 and 26. Simultaneously, controllable transfer means 30 may select a gripper 33, stored on a fixture (not shown), which is configured for grasping presentation device 20. Selection of a gripper which is configured for grasping presentation device 20 typically entails exchanging the gripper configured for picking and placing parts for a gripper that can grasp presentation devices. While it may be desirable to utilize a universal gripper which is configured for handling both parts and presentation devices, such a universal gripper may not be feasible under certain circumstances. Therefore, while numerous grippers are generally employed for handling different part shapes and geometries, a common gripper is desired for handling an assortment of presentation devices having different shapes and forms. Once the exchange units decouple, gripper 33 of arm 32 may grasp presentation device 20, and remove it from base exchange unit 26. Both presentation device 20 and attached tool exchange unit 24 are then set on a rack (not shown), and gripper 33 of arm 32 grasps a newly selected presentation device 20 from the rack for attachment to base exchange unit 26. Once exchange of the presentation devices is complete, controllable transfer means 30 may select a gripper configured for picking parts from the newly selected presentation device.

While several aspects of the present invention have been described and depicted herein, alternative aspects may be effected by those skilled in the art to accomplish the same objectives. For instance, while a fiberoptic detector has been described herein, other detectors, such as electrical detectors, and air detectors are equally adaptable to the present invention. Structural variations for passing the fiberoptic cable through the exchange units may also be effected by those skilled in the art. Accordingly, it is intended by the appended claims to cover all such alternative aspects as fall within the true spirit and scope of the invention.

What is claimed:

1. In a parts feeding system, the combination comprising:

a base exchange unit;

a parts presentation device having a tool exchange unit attached thereto;

said exchange units being mutually adapted to be coupled and decoupled to and from one another and at least one of the units being controllably operable for such coupling and decoupling;

controllable transfer means separate from the base exchange unit for (1) grasping and placing the presentation device on the base exchange unit so that the exchange units are positioned for coupling and (2) grasping and removing the presentation device from the base exchange unit when the units are decoupled; and control means for coordinating the operation of the at least one exchange unit and the transfer means so as to provide for placement and coupling of the presentation device to the base exchange unit and for decoupling and removal of the presentation device.

2. The combination of claim 1, wherein the controllable transfer means comprises a robot and a robot arm.

3. The combination of claim 1, wherein the controllable transfer means comprises a pick and place device.

4. The combination of claim 1 further comprising means associated with the presentation device for detecting the presence of a part at a predefined location on said presentation device and for generating a signal when a part is so detected.

5. The combination of claim 4 wherein the transfer means is adapted to remove parts from the predefined location and place them at another location and the detecting and generating means is connected to said control means for controlling the remove and place operation of the transfer means.

6. The combination of claim 4, wherein said detecting means comprises an optical detector.

7. The combination of claim 6, wherein said optical detector comprises at least one optical pathway section positioned and configured on each exchange unit so as to be optically aligned when the exchange units are coupled.

8. The combination of claim 6 wherein the optical detector is comprised of:

a first fiberoptic cable segment having one end exposed to a light source and the other end mounted on the base exchange unit;

a second fiberoptic cable segment having one end mounted on the tool exchange unit and the other end mounted on the presentation device adjacent to the predefined location; and the mounting of the cable segments on the exchange units being such that the segments are optically aligned with one another when the exchange units are coupled.

9. The combination of claim 8 wherein the cable segments are detachably mounted to the exchange units.

* * * * *